United States Patent Office 2,773,900
Patented Dec. 11, 1956

2,773,900

SUBSTITUTED ARYL AMINO ALKYL ETHERS

Jack Mills, Glenns Valley, Ind., assignor to Eli Lilly and Company, Indianapolis, Ind., a corporation of Indiana No Drawing. Application November 8, 1954,
Serial No. 467,635

4 Claims. (Cl. 260—570.7)

My invention relates to certain novel substituted aryl amino alkyl ethers, and more particularly, to novel tertiary amino alkyl ethers of substituted phenols, and their acid addition salts.

By this invention I have provided certain novel bases and their nontoxic pharmaceutically useful acid addition salts, said bases being represented by the formula

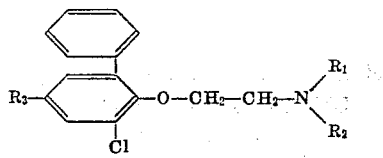

in which $R_1$ and $R_2$ represent lower alkyl groups and $R_3$ is a hydrogen or a chlorine atom. The compounds of this invention are pharmaceutically useful as drug-prolonging agents, for example, in prolonging and potentiating the action of barbiturates and analgesics. For such purposes the above novel compounds can be incorporated into tablets, capsules, suspensions, emulsions, solutions, and other like pharmaceutical forms, using the appropriate pharmaceutical extending media as known to the art. The compounds exhibit their usefulness as drug-prolonging agents when administered orally or parenterally in conjunction with the drug whose action is to be prolonged.

In the above formula, $R_1$ and $R_2$ can be the same or different lower alkyl radicals such as methyl, ethyl, propyl, isopropyl, and the like. Among the acids which can form nontoxic, pharmaceutically useful acid addition salts with the bases of the above formula are the following: hydrochloric acid, hydrobromic acid, sulfuric acid, ascorbic acid, phosphoric acid, tartaric acid, maleic acid, succinic acid, oxalic acid, and the like.

Broadly, the novel amino alkyl phenyl ethers provided by my invention are prepared as follows: An alkali metal salt of the substituted phenol is prepared in a suitable solvent. To this stirred mixture is added a dialkyl-β-haloethyl amine in the form of its free base. The reaction mixture is heated for several hours, and is then filtered to remove inorganic salts. The resulting amino alkyl phenyl ether is contained in the filtrate and is isolated and purified by conventional means, such including extraction into dilute acid, neutralization of the acid extract, extraction back into an organic phase, distillation of the free base, and preparation therefrom of a crystalline acid addition salt.

My invention is further illustrated by the following specific examples:

EXAMPLE 1

*Preparation of 2-chloro-6-phenylphenyl dimethylaminoethyl ether hydrochloride*

2.5 g. of sodium metal were reacted with 200 ml. of ethanol to form a solution of sodium ethoxide. 20.5 g. of 2-chloro-6-phenylphenol were added with stirring to this solution, yielding the sodium salt of the phenol. 18 g. of dimethyl-β-chloroethylamine were next added to the reaction mixture. After addition of the amine was complete, the reaction mixture was heated to refluxing temperature for about 12 hours, thus forming 2-chloro-6-phenylphenyl dimethylaminoethyl ether. The reaction mixture was cooled and was filtered to remove inorganic salts. About 1 l. of diethyl ether was added to dilute the alcohol. The organic layer which separated was shaken with dilute hydrochloric acid, the 2-chloro-6-phenylphenyl dimethylaminoethyl ether being extracted into the aqueous acid layer as the soluble hydrochloride salt. The acid extract was then made basic with aqueous sodium hydroxide solution and the amino-ether which separated from solution was extracted into diethyl ether. The ether layer was washed with water, was dried with anhydrous magnesium sulfate, and the ether was evaporated off. The oily residue comprising 2-chloro-6-phenylphenyl dimethylaminoethyl ether was distilled. The distillate was dissolved in ether and HCl gas bubbled into the solution in order to prepare the hydrochloride salt of 2-chloro-6-phenylphenyl dimethylaminoethyl ether. After recrystallization, this hydrochloride salt melted at about 183–184° C. Analysis showed the presence of 4.40 percent of nitrogen as compared with the calculated amount of 4.49 percent of nitrogen.

Other salts of 2-chloro-6-phenylphenyl dimethylaminoethyl ether are made by dissolving the free base in ether and adding an equivalent weight of the desired acid thereto. Thus, by addition of maleic or phosphoric acid to ether solutions of the said base, there were obtained the corresponding maleate and phosphate salts, respectively. Likewise, other salts such as the tartrate, ascorbate and sulfate can be prepared by a similar procedure.

EXAMPLE 2

*Preparation of 2,4-dichloro-6-phenylphenyl dimethylaminoethyl ether*

A toluene solution containing 23.9 g. of 2,4-dichloro-6-phenylphenol was added to a refluxing toluene suspension of 5.2 g. of sodium hydride, thus forming the sodium salt of the phenol. Refluxing was continued for one hour after addition of the phenol was complete. An ether solution containing 21.6 g. of dimethyl-β-chloroethylamine was then added dropwise to the reaction mixture, and heating at refluxing temperature was continued overnight. By this reaction 2,4-dichloro-6-phenylphenyl dimethylaminoethyl ether was formed. The reaction mixture was poured over ice and 500 ml. of diethyl ether were added thereto. The organic layer was separated and then extracted twice with 200 ml. portions of 10 percent hydrochloric acid, the amino-ether being extracted into the acidic layer at this point. The acidic extracts were combined, were made basic with aqueous sodium hydroxide, were extracted with two 500 ml. portions of ether, and the amino-ether extracted back into diethyl ether. The combined ether extracts, which now contained the free base of 2,4-dichloro-6-phenylphenyl dimethylaminoethyl ether were dried and filtered, and the filtrate was distilled. 2,4-dichloro-6-phenylphenyl dimethylaminoethyl ether distilled at about 138–156° C. at a pressure of about 0.4 mm. of mercury. The yield was 22 g.

The hydrochloride salt of 2,4-dichloro-6-phenylphenyl dimethylaminoethyl ether was prepared and purified by the procedures disclosed in Example 1. It melted at about 186–187° C. Analysis showed the presence of 3.89 percent nitrogen as compared with the calculated value of 4.10 percent.

EXAMPLE 3

*Preparation of 2,4-dichloro-6-phenylphenyl diethylaminoethyl ether*

A solution of sodium ethoxide was prepared by dissolving 2.5 g. of sodium in 200 ml. of ethanol. 26.3 g. of 2,4-dichloro-6-phenylphenol were added dropwise to this solution, thus forming the sodium salt of the phenol. To the resulting solution were added 23 g. of diethyl-β-chloroethylamine and the mixture was heated at refluxing temperature overnight. The reaction mixture containing the desired 2,4-dichloro-6-phenylphenyl diethylaminoethyl ether was poured over ice, and the amino-ether was extracted into diethyl ether. The ether layer was then extracted twice with dilute hydrochloric acid. The combined acid extracts were made basic and the base insoluble material, comprising 2,4-dichloro-6-phenylphenyl diethylaminoethyl ether was extracted into diethyl ether. The ether layer was washed with water, was dried over anhydrous magnesium sulfate, and was filtered to remove the drying agent. The solvent was evaporated in vacuo, and the residue of 2,4-dichloro-6-phenylphenyl diethylaminoethyl ether was distilled. The fraction boiling between about 150–162° C. at a pressure of about 1.0 mm. of mercury was collected. This fraction was converted to the hydrobromide salt by the method of Example 1. The resulting crystalline material, 2,4-dichloro-6-phenylphenyl diethylaminoethyl ether hydrobromide, melted at about 131–132° C. Analysis showed the presence of 18.82 percent bromine as compared with the calculated value of 19.08 percent.

I claim:

1. A pharmacologically active compound of the class consisting of a base and its nontoxic pharmaceutically useful acid addition salts, said base being represented by the formula

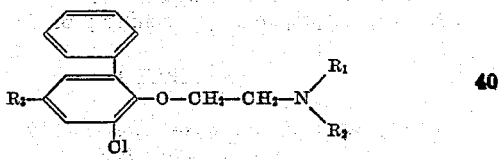

in which $R_1$ and $R_2$ represent lower alkyl groups and $R_3$ is chosen from the class consisting of a hydrogen atom and a chlorine atom.

2. A base represented by the following formula

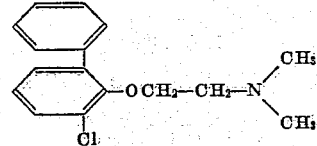

3. A base represented by the following formula

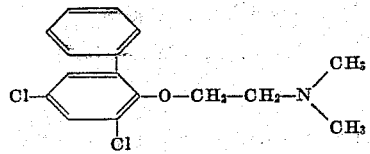

4. A base represented by the following formula

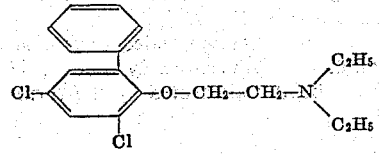

References Cited in the file of this patent

UNITED STATES PATENTS

| | | |
|---|---|---|
| 2,187,723 | Alquist et al. | Jan. 23, 1940 |
| 2,217,660 | Alquist et al. | Oct. 15, 1940 |
| 2,703,324 | Binkley et al. | Mar. 1, 1955 |